(12) United States Patent
Endo et al.

(10) Patent No.: US 7,845,624 B2
(45) Date of Patent: Dec. 7, 2010

(54) CYLINDRICAL FLUID-FILLED ELASTIC MOUNT

(75) Inventors: Masami Endo, Niwa-Gun (JP); Kazuhiko Kato, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 828 days.

(21) Appl. No.: 11/683,511

(22) Filed: Mar. 8, 2007

(65) Prior Publication Data
US 2007/0273076 A1    Nov. 29, 2007

(30) Foreign Application Priority Data
Mar. 30, 2006 (JP) .............................. 2006-092814
Aug. 4, 2006 (JP) .............................. 2006-212847

(51) Int. Cl.
F16F 13/04 (2006.01)
(52) U.S. Cl. ................................ 267/140.12; 267/219
(58) Field of Classification Search ............ 267/140.12, 267/140.4, 141, 141.1, 141.4, 141.5, 292, 267/293
See application file for complete search history.

(56) References Cited

U.S. PATENT DOCUMENTS

| | | | |
|---|---|---|---|
| 4,702,346 A | 10/1987 | Uno et al. | |
| 5,156,379 A * | 10/1992 | Tabata | 267/140.12 |
| 5,188,346 A * | 2/1993 | Hamada et al. | 267/140.12 |
| 6,450,487 B1 * | 9/2002 | Kuwayama | 267/141 |
| 6,550,754 B2 * | 4/2003 | Kuwayama | 267/141.5 |
| 6,598,863 B2 | 7/2003 | Kato | |
| 6,817,599 B2 * | 11/2004 | Kato et al. | 267/141.2 |
| 6,857,623 B2 * | 2/2005 | Kuwayama | 267/141.3 |
| 7,100,909 B2 * | 9/2006 | Ito | 267/140.12 |
| 2003/0222384 A1 * | 12/2003 | Kato et al. | 267/141.2 |
| 2005/0230889 A1 | 10/2005 | Minamisawa | |
| 2006/0006592 A1 * | 1/2006 | Kato | 267/140.12 |

FOREIGN PATENT DOCUMENTS

| | | | |
|---|---|---|---|
| JP | 63-210431 A1 | | 9/1988 |
| JP | 02026337 A | * | 1/1990 |
| JP | 04-302736 A1 | | 10/1992 |
| JP | 06-025731 Y2 | | 7/1994 |
| JP | 06-045073 Y2 | | 11/1994 |
| JP | 08-291841 A1 | | 11/1996 |
| JP | 2583212 B2 | | 11/1996 |
| JP | 2001-208124 A1 | | 8/2001 |
| JP | 2001-317583 A1 | | 11/2001 |

* cited by examiner

*Primary Examiner*—Robert A Siconolfi
*Assistant Examiner*—Stephen Bowes
(74) *Attorney, Agent, or Firm*—Burr & Brown

(57) ABSTRACT

A cylindrical fluid-filled elastic mount which has a structure that avoids or mitigates a deterioration of damping effect, when an outer cylindrical member is subjected to a diameter-reducing operation. A cylindrical fluid-filled elastic mount including; a communication groove connecting a pair of pockets in the circumferential direction formed in an elastic body; fluid chambers provided by the corresponding pockets; an orifice member having a trough-form protrusion in which both-side wall portions provided at an end of the orifice groove are formed by an elastic material. The trough-form protrusion is inserted in the communication groove. At least one hollow groove is provided along the communication groove where the trough-form protrusion is inserted, and the hollow groove is formed longer in the circumferential direction than a length of a protrusion part of the trough-form protrusion.

12 Claims, 14 Drawing Sheets

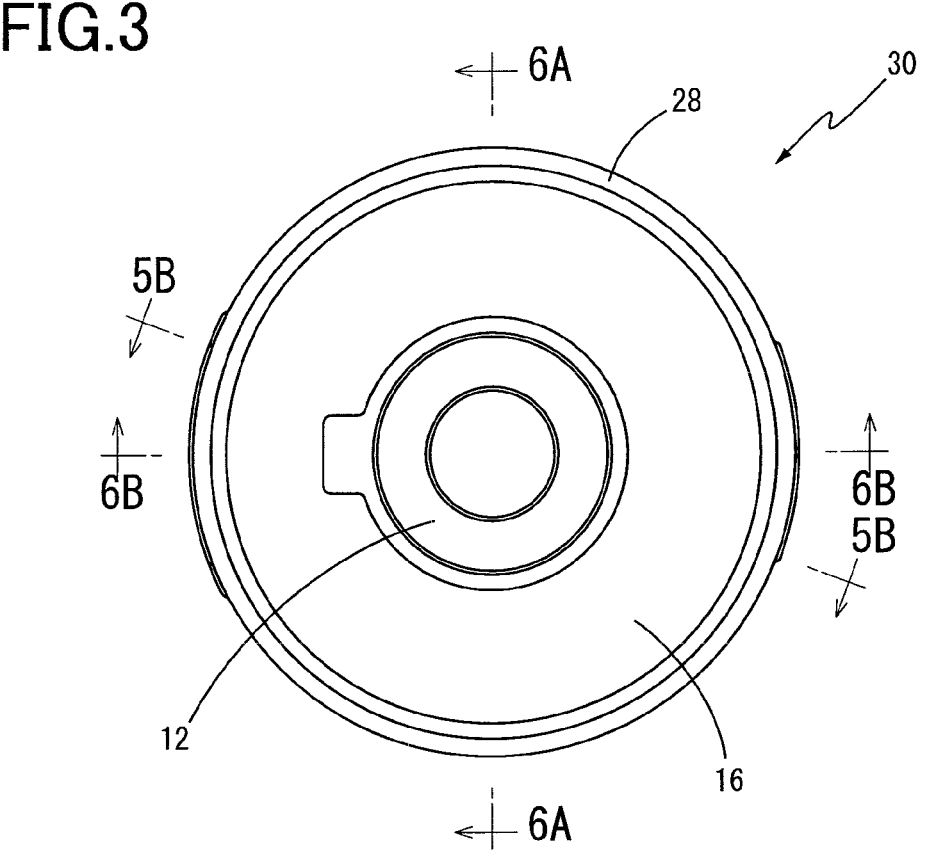

CYLINDRICAL FLUID-FILLED ELASTIC MOUNT

The present application is based on Japanese Patent Application No. 2006-092814 filed on Mar. 30, 2006 and No. 2006-212847 filed on Aug. 4, 2006, the contents of which are incorporated herein by reference.

BACKGROUND OF THE INVENTION

1. Field of the Invention

The present invention relates to a cylindrical fluid-filled elastic mount, and more particularly to an improved structure of a cylindrical fluid-filled elastic mount which has a plurality of fluid chambers filled with a non-compressible fluid so as to exhibit an excellent damping effect on the basis of flow of the fluid therebetween.

2. Discussion of Related Art

As a damping connecting device of a type adapted to be interposed between two members of a vibration-transmitting system so as to elastically connect these members, there is known a cylindrical fluid-filled elastic mount in which a center shaft member to be attached to the one of the members to be elastically connected and an outer cylindrical member to be attached to the other member of the two members disposed outside in a direction perpendicular to the axial direction with a suitable distance around the center shaft, and are elastically connected to each other by an elastic body interposed therebetween. A plurality of fluid chambers filled with a non-compressible fluid is formed in the elastic body so as to be located in the axial direction or in the circumferential direction. Further, an orifice passage is formed which permits predetermined two fluid chambers of the plurality of fluid chambers to communicate each other, thereby, upon application of vibration, the fluid filled in each of the two fluid chambers is allowed to flow mutually through the orifice passage.

In the cylindrical fluid-filled elastic mount described above, which is capable of exhibiting damping effect upon an application of vibrations, on the basis of flows (such as resonance) of a fluid through the orifice passage. The thus constructed cylindrical fluid-filled elastic mount has been suitably used as an engine mount, a body mount, or a suspension bush such as a strut bar cushion for a motor vehicle, for instance.

In the cylindrical fluid-filled elastic mount described above, the applied vibration to be controlled is in a frequency region corresponding to the cross-sectional area and the length of the passage of the orifice passage (hereinafter may be referred to as "flow path"). Therefore, an orifice member cooperating with the outer cylindrical member to form the orifice passage therebetween is disposed in a pocket of elastic body which provides the fluid chamber. Whereby, a higher degree of freedom in designing the length and the cross-sectional area of fluid flow is realized, and the tuning range of frequency is easily and suitably tuned. Such a cylindrical fluid-filled elastic mount is disclosed in, JP-A-63-210431, JP-2583212, and JP-U-B-6-25731, for instance.

Such a conventional cylindrical fluid-filled elastic mount, includes; a center shaft member; a metal sleeve disposed radially outwardly of the center shaft member with a predetermined radial distance therebetween provided with a plurality of windows; an elastic body interposed between the center shaft member; a metal sleeve for elastic connection therebetween; a plurality of pockets provided in the elastic body and being open in an outer circumferential surface of the metal sleeve through the corresponding windows thereof; a communication groove provided so that two pockets to be connected, of the plurality of pockets, communicate therebetween in a circumferential direction so as to be open in the outer circumferential surface; an orifice member provided with an orifice groove at an outer surface thereof, which has the opposed end portions provided at an end of the orifice groove is inserted in the communication groove so as to be fixed to the communication groove; and an outer cylindrical member fitted on the metal sleeve to close the plurality of windows and the orifice groove, whereby the plurality of fluid chambers filled with a non-compressible fluid are defined by the corresponding pockets, at the same time an orifice passage is defined by the corresponding orifice groove.

However, in the conventional cylindrical fluid-filled elastic mount described above, since a relatively hard material having a high rigidity such as a metal or a resin is used as the material for the orifice member, it is cumbersome to seal the orifice passage formed by the orifice member, which involves a problem that the damping effect may not be exhibited sufficiently in the case that the fluid leaks from the orifice passage. In addition, if the orifice member formed of metal or resin abuts or touches other apparatus forming members when vibrations are applied, there arises a problem of generating noise and the like problems.

To avoid the drawback described above, it may be considered to form the orifice member by an elastic material, especially, a vulcanized product of elastic material. At the same time, at least both-side walls of a trough-form protrusion provided in an orifice groove end portion as an orifice member are made of rubber, and the trough-form protrusion is inserted in a communication groove formed in a communication groove-forming elastic member disposed on the outer peripheral portion of the metal sleeve. When this structure is employed, the problems described below may occur.

The outer cylindrical member is subjected to diameter-reducing operation by drawing to fix the outer cylindrical member on the metal sleeve. Due to such diameter-reducing operation, compressive action is applied to the both-side elastic portions forming the communication groove. Accordingly, the rubber falls into the communication groove from both sides, or expands as seen in FIG. 14. Thereby, the both-side walls of the trough-form protrusion of the orifice member inserted in the communication groove are deformed and fall to the orifice groove side, as a result, the cross-sectional area of the orifice passage has a smaller amount of flow of fluid. Therefore, there arises a problem that it is difficult to sufficiently achieve the intended damping characteristic based on the flow of fluid in the orifice passage. Also, there arises a problem that the deformation of both-side walls made of rubber may deteriorate sealing.

SUMMARY OF THE INVENTION

The present invention has been made in the light of the situations described above. It is therefore an object of the invention to provide a cylindrical fluid-filled elastic mount which reduces and restrains a change in the cross-sectional area of flow path of an orifice passage effectively, and avoids and mitigates a deterioration of a damping effect, in the case where an outer cylindrical member is subjected to diameter-reducing operation.

In order to solve the above problem and other problems that are understood from the entire specification and the drawings, the above object may be accomplished according to various modes as described below. The modes described below can be employed being combined arbitrarily. It is to be understood that the modes and technical features of the present invention are not limited to those described below, and can be recognized based on the spirit and scope of the invention disclosed in the entire specification and the drawings.

(1) A cylindrical fluid-filled elastic mount, including: a center shaft member; a metal sleeve disposed radially outwardly of the center shaft member with a predetermined radial distance therebetween, which has a plurality of windows passed through a cylindrical wall thereof; an elastic body interposed between the center shaft member and the metal sleeve for elastic connection therebetween, which has a plurality of pockets being open in an outer circumferential surface of the metal sleeve through the corresponding windows thereof; a communication groove-forming elastic member disposed on the outer circumferential surface of the metal sleeve, which has a communication groove so that the two pockets to be connected, of the plurality of pockets, communicate therebetween in the circumferential direction so as to be open in the outer circumferential surface; an orifice member provided with an orifice groove at an outer surface thereof, which has a trough-form protrusion in which at least both-side wall portions provided at an end of the orifice groove are formed by an elastic material, and the trough-form protrusion being inserted in the communication groove so as to be fixed to the communication groove; and an outer cylindrical member fitted on the metal sleeve and fixed by decreasing the diameter to close at least the plurality of windows and the orifice groove, and defining a plurality of fluid chambers filled with a non-compressible fluid corresponding to the pockets and an orifice passage corresponding to the orifice groove. In the cylindrical fluid-filled elastic mount, at least one hollow groove is provided along the communication groove so as to extend in the circumferential direction, and is located in a portion of the communication groove-forming elastic member on at least one side of the communication groove, in which the trough-form protrusion provided in an end portion of the orifice groove of the orifice member is inserted, and wherein the at least one hollow groove is formed longer in the circumferential direction than a length of a protrusion part of the trough-form protrusion.

(2) The cylindrical fluid-filled elastic mount according to mode (1), an end surface of a portion surrounding the trough-form protrusion of the orifice member is formed into a shape corresponding to an end surface around the communication groove of the communication groove-forming elastic member in which the trough-form protrusion is inserted, and the two end surfaces are brought into abutting contact with each other and secured, for effecting sealing between the orifice member and the communication groove-forming elastic member.

(3) The cylindrical fluid-filled elastic mount according to mode (1) or (2), the orifice groove provided at the outer surface of the orifice member is formed at the trough-form protrusion, so as to have a cross-sectional area to permit a larger amount of flow of the fluid than another portion having the cross-sectional area corresponding to a vibration frequency to be controlled.

(4) The cylindrical fluid-filled elastic mount according to any one of modes (1) to (3), the orifice member is a vulcanized product of an elastic material.

(5) The cylindrical fluid-filled elastic mount according to any one of modes (1) to (4), the orifice member is formed into an arcuate shape set in the circumferential direction in an opening portion of the pocket; the trough-form protrusion is formed at a first end of the orifice groove provided at the outer surface of the orifice member; and a second end of the orifice groove is subjected to communicate with an interior of the pocket.

(6) The cylindrical fluid-filled elastic mount according to any one of modes (1) to (5), the orifice member is formed so that a bottom surface of the pocket is brought into abutting contact with an inside surface of the orifice member in the radial direction of the arcuate shape upon application of a large displacement between the center shaft member and the outer cylindrical member in the radial direction, and the orifice member functions as a stop (7) The cylindrical fluid-filled elastic mount according to mode (6), the orifice member includes an abutting portion consisting of the elastic material on the inside surface of the arcuate shape, the orifice passage is tuned to a frequency region of shimmy, and further the shaft member and the outer cylindrical member are interposed between two members forming a vibration-transmitting system of a vehicle, the orifice member is brought into abutting contact with the bottom surface of the pocket at the abutting portion when a displacement between the center shaft member and the outer cylindrical member in the radial direction is applied due to a load applied at the time of braking of the vehicle under a condition in which the two members are connected to the center shaft member and the outer cylindrical member.

(8) The cylindrical fluid-filled elastic mount according to mode (7), the orifice passage is tuned to a relatively low frequency region of shimmy.

(9) The cylindrical fluid-filled elastic mount according to mode (7) or (8), the abutting portion of orifice member is formed of highly damping rubber material.

(10) The cylindrical fluid-filled elastic mount according to mode (7) or (8), the abutting portion of orifice member is formed of self-lubricating rubber material.

(11) The cylindrical fluid-filled elastic mount according to any one of modes (1) to (10), a stopper rubber protrusion having a predetermined height is integrally formed on the bottom surface of the pocket.

(12) The cylindrical fluid-filled elastic mount according to any one of modes (1) to (11), a sealing protrusion continuously extending along the communication groove is formed on an each upper surface of both-side walls of the communication groove formed in the communication groove-forming elastic member respectively, while the sealing protrusions are provided continuously on the both-side walls so as to extend surrounding the communication groove on an end surface around the communication groove, and are mutually connected.

In the cylindrical fluid-filled damping device of the present invention constructed as described above, in a state in which the trough-form protrusion is inserted in the communication groove which connects two pockets in the elastic body in the circumferential direction, the outer cylindrical member is fitted on the metal sleeve and the diameter-reducing operation is performed on the outer cylindrical member, thereby an inward deformation stress led to the communication groove, which caused by a radial compressive action applied to the communication groove-forming elastic portion around the communication groove, results in being shut off effectively by the hollow groove provided along the communication groove. Therefore, deformation or fall of the both-side walls of the trough-form protrusion formed of elastic material inserted in the communication groove can be restrained or inhibited advantageously. Thereby, the deterioration of damping characteristic caused by a change in the amount of fluid flow of cross-sectional area of the orifice passage can also be inhibited or alleviated.

In the cylindrical fluid-filled elastic mount constructed according to the present invention, the length of at least one hollow groove along the communication groove formed in the groove-forming elastic member is longer than the length of the protrusion part of the trough-form protrusion of the orifice member to be inserted in the communication groove. Consequently, the deforming action, which acts into the communication groove on the basis of the compression of the communication groove-forming elastic member in which the communication groove is formed, acting over the total length of the trough-form protrusion can be avoided effectively. Thereby, the deforming action on the wall of elastic material constituting the both-side walls of the trough-form protrusion can be reduced or avoided advantageously, and the object of the present invention may be accomplished sufficiently.

BRIEF DESCRIPTION OF THE DRAWINGS

The above and other objects, features, advantages and technical significance of the present invention will be better understood by reading the following detailed description of a presently preferred embodiment of the invention, when considered in connection with the accompanying drawings, in which:

FIG. 2 is an elevational views in axial cross section corresponding to FIG. 1.

FIG. 3 is a front view of the intermediate vulcanized product used in the cylindrical fluid-filled elastic mount as seen in FIG. 1;

FIG. 4 is an elevational side views.

FIG. 5 is different views of the intermediate vulcanized product as seen in FIG. 3.

FIG. 6 is a different cross sectional view of the intermediate vulcanized product as seen in FIG. 3.

FIG. 10 is different views of FIG. 9.

FIG. 14 is an explanatory view showing a state in which an orifice member is mounted on an intermediate vulcanized product having no hollow groove on the both sides of a communication groove.

DETAILED DESCRIPTION OF THE INVENTION

Figure 1:
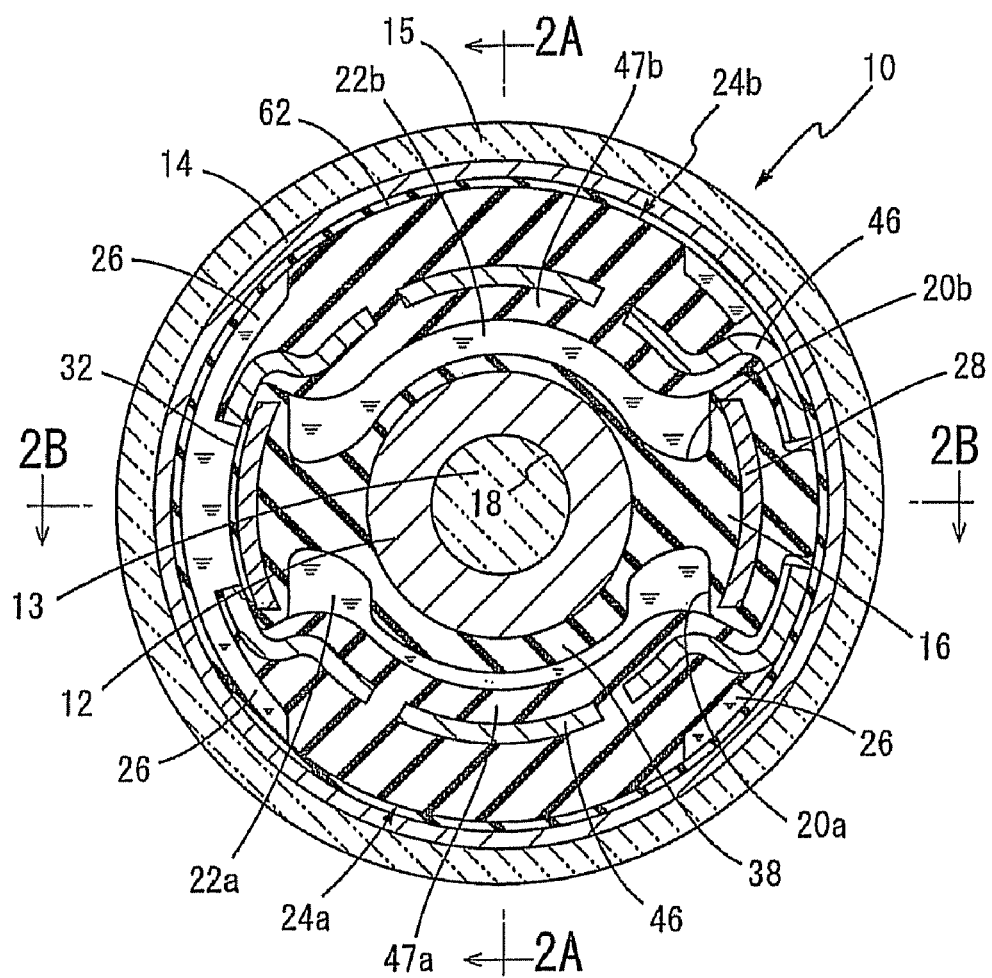
FIG. 1 is a transverse sectional view of one embodiment of a cylindrical fluid-filled elastic mount according to the present invention.

To further clarify the present invention, there will be described preferred embodiments of the invention by referring to the drawings.

Figure 2A:
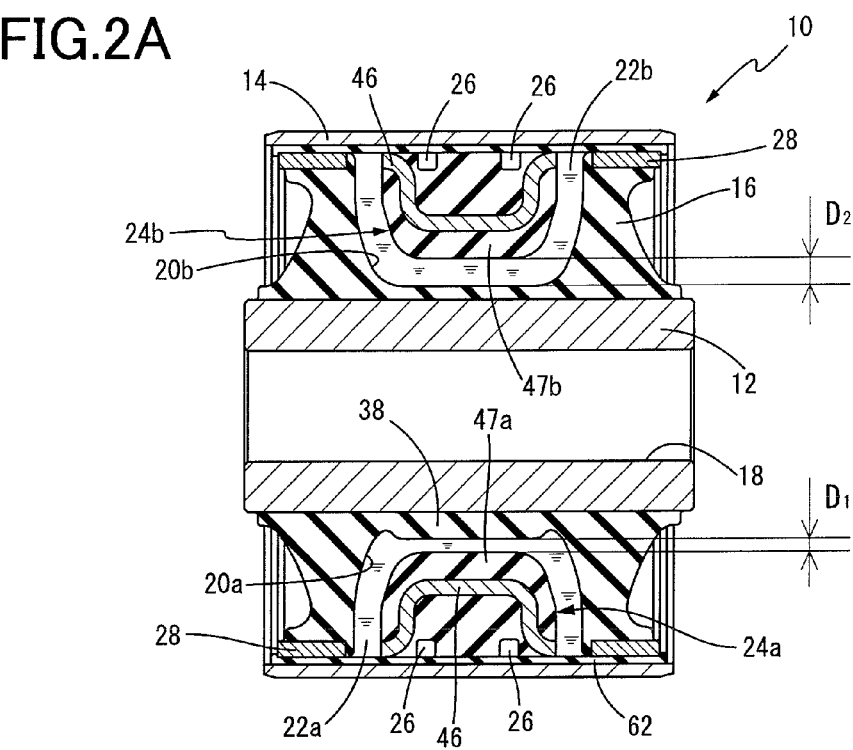
FIG. 2A is the view taken along line 2A-2A of FIG. 1
Figure 2B:
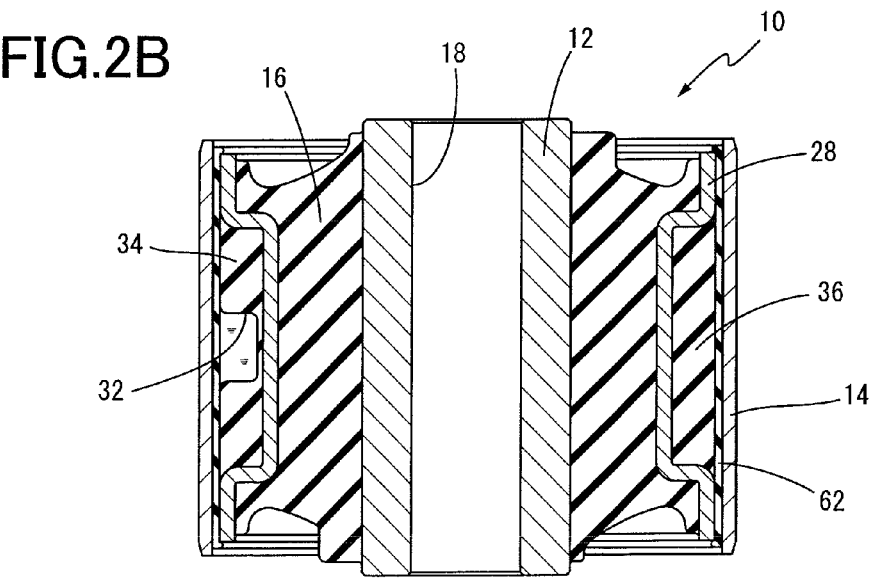
FIG. 2B is the view taken along line 2B-2B of FIG. 1.

Referring first to a transverse sectional view of FIG. 1 and an axial cross sectional view of FIG. 2, there is shown a cylindrical fluid-filled elastic mount in the form of a suspension bush for a motor vehicle, which is constructed according to one embodiment of the invention. The suspension bush indicated at 10 in FIGS. 1 and 2 includes an inner sleeve 12 and an outer sleeve 14 which is disposed radially outwardly of the inner sleeve 12, such that the sleeves 12,14 are spaced apart from each other in a direction perpendicular to an axial direction with a suitable distance therebetween, in a coaxial or concentric relation with each other. The inner and outer sleeve 12, 14 are elastically connected to each other via elastic body 16 interposed therebetween.

In the suspension bush 10 of this embodiment, a shaft 13 fixedly provided on a suspension arm is inserted and fixed to an inner hole 18 of the inner sleeve 12 while a cylindrical arm eye 15 provided on the vehicle body is fixed on the outer sleeve 14, whereby the suspension bush 10 is disposed on a member for attaching the suspension arm to the vehicle body. With the suspension bush 10 thus installed on the vehicle, which is capable of exhibiting damping effect with respect to vibrations (loads) received in its radial direction (the direction perpendicular to the axial direction), which is the vertical direction as seen in FIG. 1.

In the thus constructed suspension bush 10, especially under a condition of being installed on the motor vehicle, on either side in the radial direction of the inner sleeve 12, a first pocket 20a and a second pocket 20b is formed in the elastic body 16 so as to be located on the side (the lower side in FIG. 1) which loads (vibrations) are applied to at the starting and accelerating time of the motor vehicle and the side (the upper side in FIG. 2) which loads (vibrations) are applied to at the braking time of the motor vehicle, respectively, and each opening portion of first and second pockets 20a, 20b are closed by the outer sleeve 14. Therefore, a first chamber 22a and a second fluid chamber 22b, which are filled with a non-compressible fluid, are formed corresponding to the arrangement positions of the first and second pockets 20a, 20b so as to be disposed on the either side which the vibrational load is applied to respectively, in a state in which the suspension bush 10 is mounted on the vehicle. Further, the first and second orifice member 24a, 24b which has a thick-wall arcuate shape as a whole, are interposed in a circumferential direction between the opening potions of the first and second pockets 20a, 20b which forming the first and second fluid chambers, respectively. Thereafter, the first and second orifice member 24a, 24b cooperates with the outer sleeve 14 to define an orifice passage 26 communicating with the first and second fluid chambers 22a, 22b.

Figure 4A:
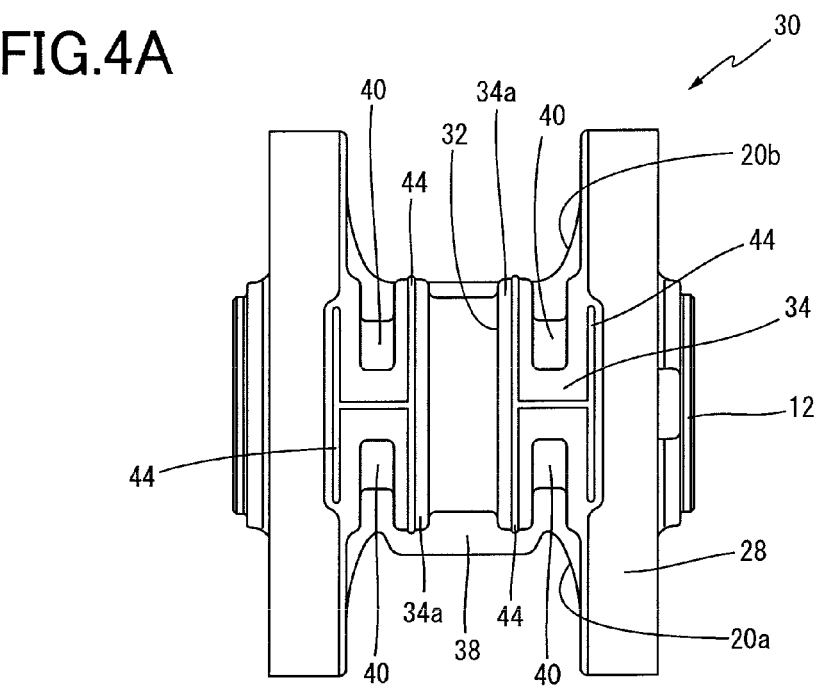
FIG. 4A is the view taken toward the left-hand side of the intermediate vulcanized product and FIG. 4B is the view taken toward the right-hand side of the intermediate vulcanized product as seen in FIG. 3.
Figure 4B:
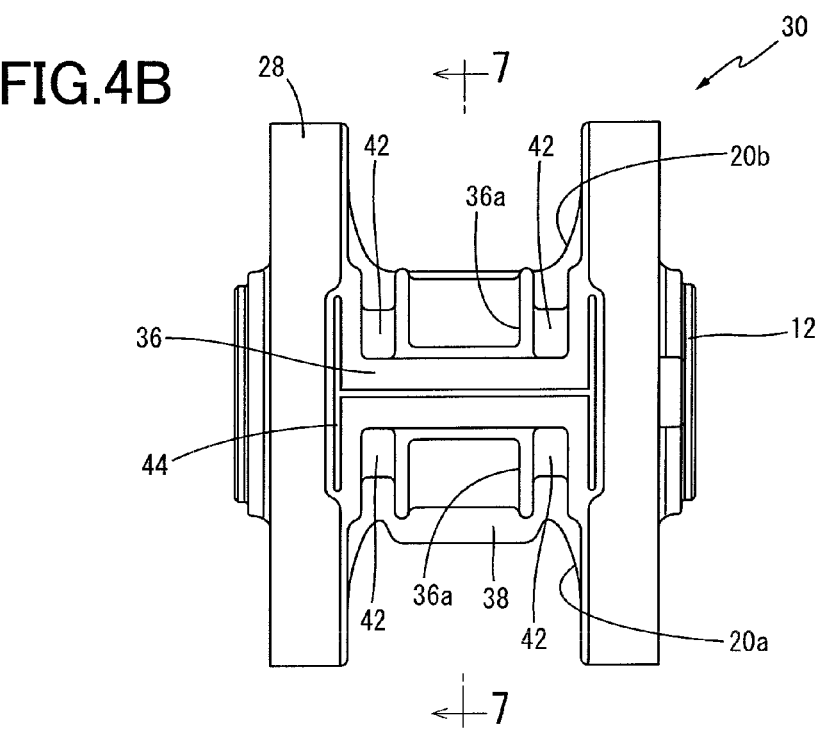
Figure 5A:
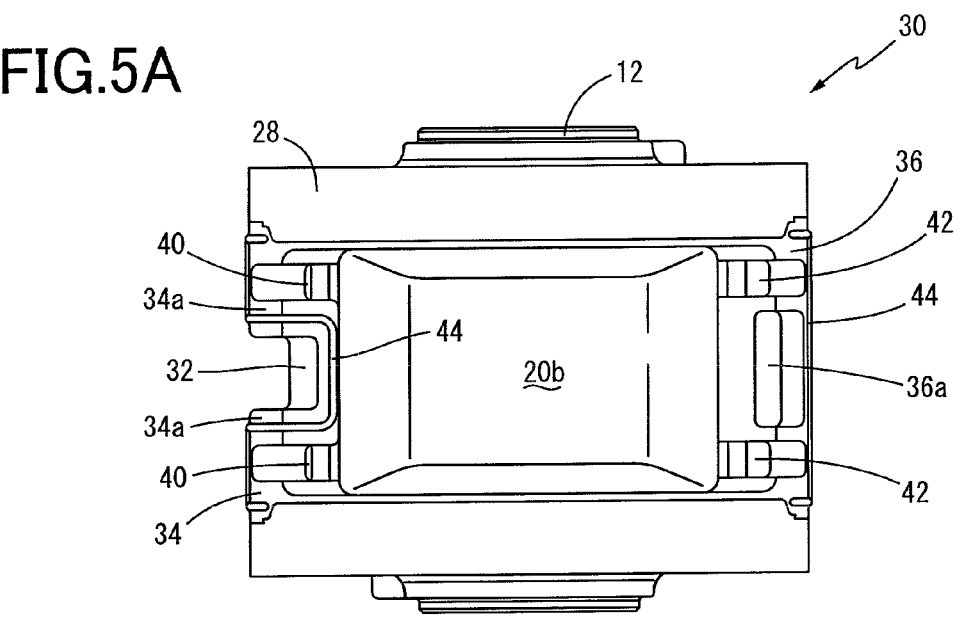
FIG. 5A is a plane view and FIG. 5B is a cross sectional view being taken along line 5B-5B of FIG. 3.
Figure 5B:
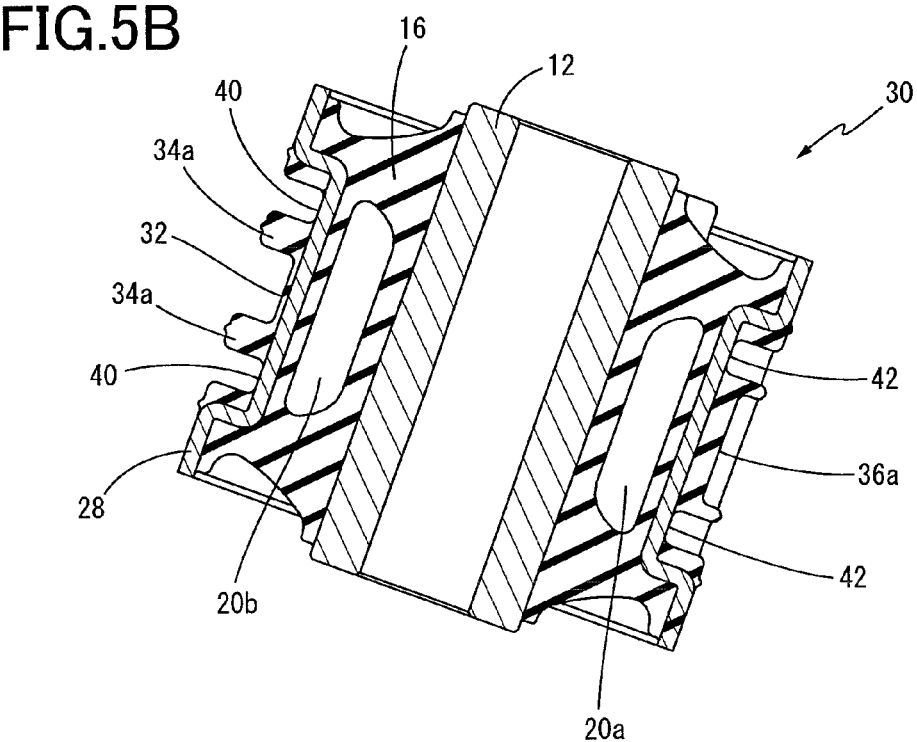
Figure 6A:
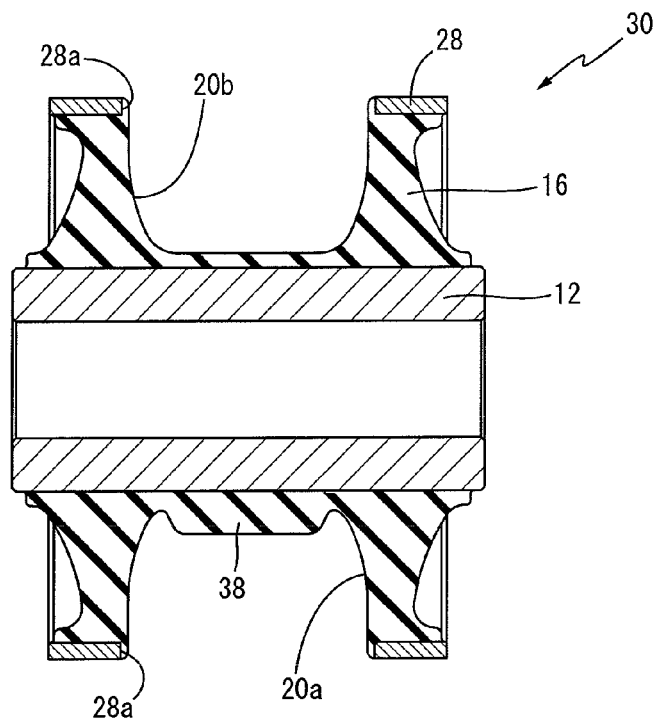
FIG. 6A is a cross sectional view taken along line 6A-6A and FIG. 6B is a cross sectional view taken along line 6B-6B of FIG. 3.
Figure 6B:
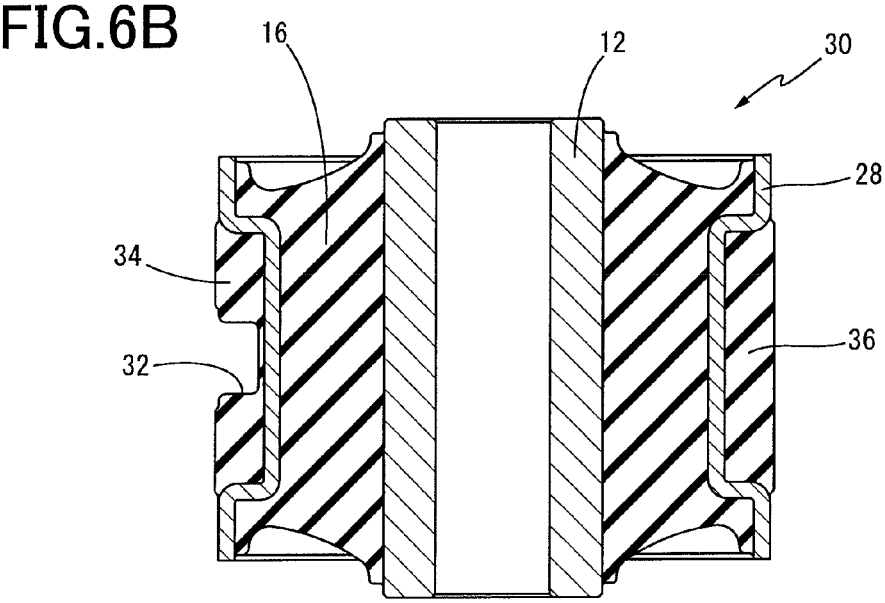
Figure 7:
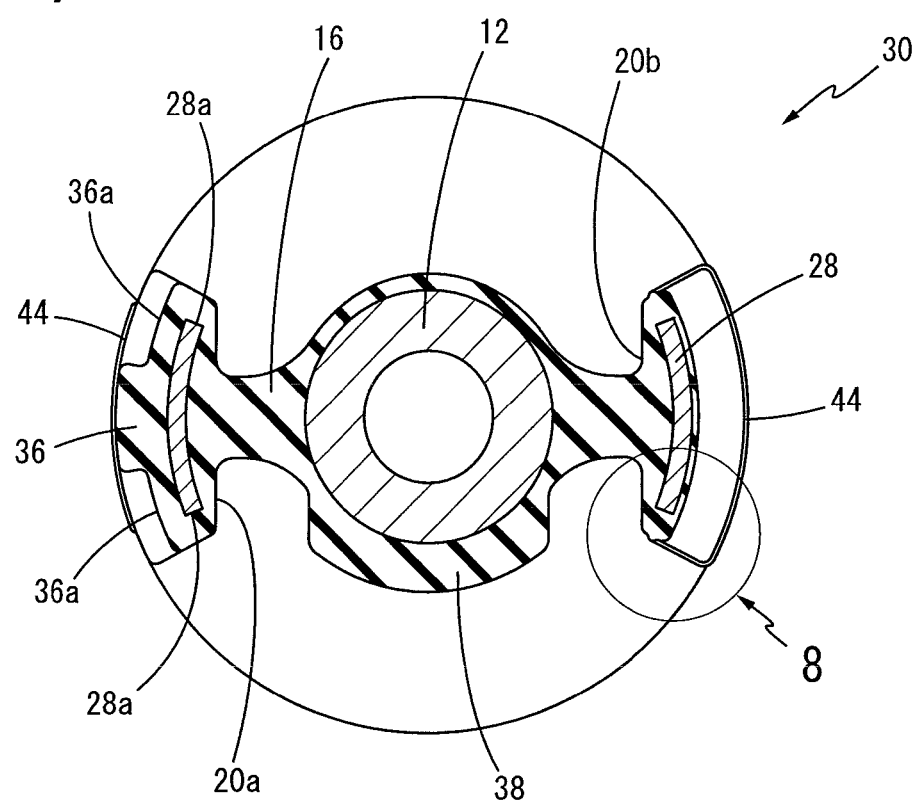
FIG. 7 is a cross sectional view taken along line 7-7 of FIG. 4B.

Described in detail, the inner sleeve 12 and the elastic body 16 constitutes an intermediate vulcanized product 30 together with a metal sleeve 28 as seen in FIGS. 3 to 7. There is formed an intermediate vulcanized product 30 in which the elastic body 16 is bonded by vulcanization operation to the inner sleeve 12 having a small-diameter cylindrical shape with a thick-wall and the metal sleeve 28 disposed radially outwardly of the metal sleeve 12 with a predetermined radial distance therebetween as apparently from above mentioned figures. The metal sleeve 28 has a stepped cylindrical shape with a small diameter at its axially intermediate portion and with a large diameter at its both ends portion, as shown in FIGS. 6 and 7. There are formed a pair of windows 28a, 28a each having a large rectangular configuration by cutting the cylindrical wall portion, and are provided symmetrically with respect to the axis.

In the intermediate vulcanized product 30 constituted by the inner sleeve 12, the metal sleeve 28, and the elastic body 16, the first and second pockets 20a, 20b opening in the outer circumferential surface of the metal sleeve 28 through the corresponding windows 28a, 28a are formed symmetrically in the above described arrangement due to such a vulcanization operation. Of a pair of pockets 20a and 20b, the first pocket 20a located on the side on which vibrational load is applied at the starting time and accelerating time of motor vehicle in the state in which the suspension bush 10 is mounted on motor vehicle, as indicated in the lower side in FIG. 7, there is formed a stopper rubber protrusion 38 having a predetermined height integrally with the elastic body 16 on the bottom surface of the first pocket 20a, as indicated in FIG. 1.

In thus intermediate vulcanized product 30, by an elastic material coming around from the elastic body 16, a communication groove 32 having a predetermined width is formed on the one side of the small diameter portion which is divided into two by the two windows 28a, 28a of the metal sleeve 28. The communication groove 32 connects the first and second pocket 20a, 20b that are open in the outer circumferential surface of the metal sleeve 28. Namely, the communication groove-forming elastic 34 is formed by the elastic material going around onto the outer circumferential surface of the one small-diameter, and the communication groove 32 having a predetermined width, which extends in the circumferential direction, is provided in the elastic body 34.

On the other side of the outer circumferential surface of the separated small-diameter portions of the metal sleeve 28, a partition wall 36 which separates the first and second windows 28a, 28b of the metal sleeve is formed by the elastic material coming around from the elastic body 16. On the both sides in the circumferential direction of the partition wall 36, there are provided locking concave portions 36a, 36a having a predetermined length for engaging the engaging portion formed on the one end in the circumferential direction of the orifice member 24, described later.

In the communication groove-forming elastic member 34 forming an above described communication groove 32, there are formed hollow grooves 40, 40 with a predetermined length provided along the communication groove 32 so as to extend in the circumferential direction, located in a portion of the communication groove-forming elastic member 34 at both sides of the communication groove 32 with the substantially equal depth to the communication groove 32 respectively, as shown in FIGS. 3 to 5. The hollow grooves 40, 40 on the both sides of the communication groove 32 extends from both end portions in the circumferential direction of the communication groove-forming elastic body 34, and are open to the corresponding pockets 20 and also are open in the outer peripheral surface. In addition, the partition wall 36 having a predetermined thickness, provided on the outer peripheral surface of the small-diameter portion of the metal sleeve 28 is provided with second hollow grooves 42, 42 extending from the first and second pockets 20a, 20b so as to be located on the both sides of the locking concave portion 36a, as shown in FIG. 4B and FIG. 5.

Figure 8:
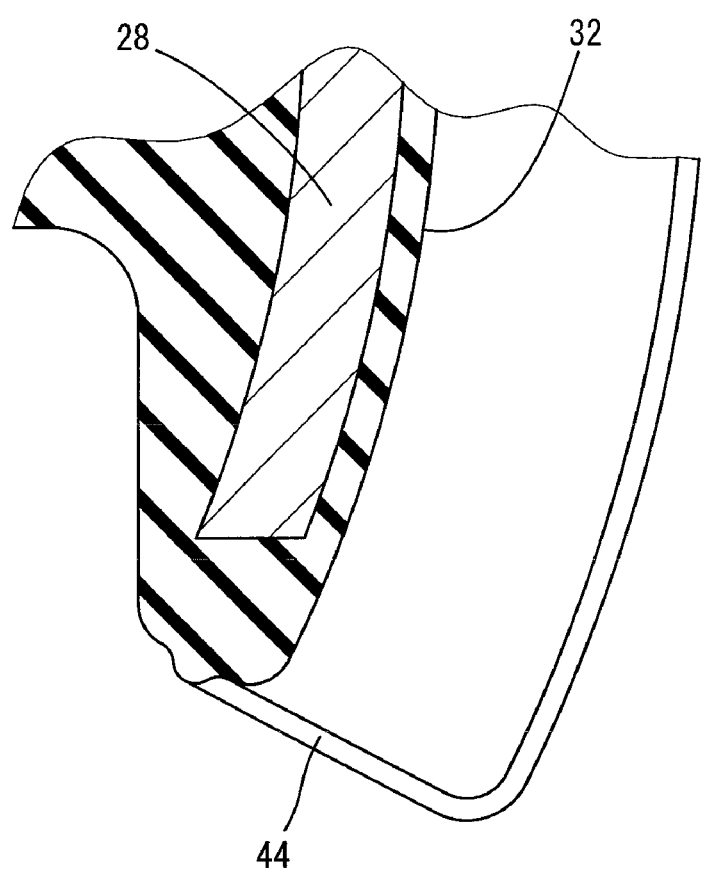
FIG. 8 is a partly enlarged view of portion 8 of FIG. 7.
Figure 9:
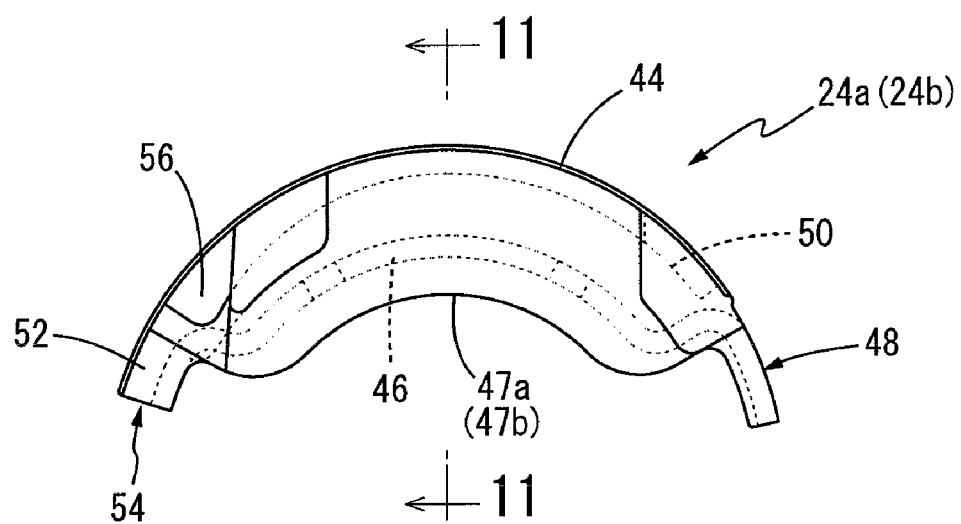
FIG. 9 is a front view of the orifice member used in a cylindrical fluid-filled elastic mount as seen in FIG. 1.

As shown in FIGS. 4, 5 and 8, for instance, sealing protrusions 44 having a semicircular cross-sectional shape are formed continuously on an outer surface of the intermediate vulcanized product 30 which is brought into abutting contact with the inner surface of the outer sleeve 14, so as to seal the pockets 20 and the communication groove 32. Therefore, the sealing protrusions 44, 44 continuously extending along the communication groove 32 is formed on an each upper surface of both-side walls of the communication groove 32 formed in the communication groove-forming elastic 34 respectively, as indicated in FIG. 4A, while the sealing protrusions 44, 44 are provided continuously on the both-side walls so as to extend surrounding the communication groove 32 on an end surface around the communication groove 32, and are mutually connected, as indicated in FIG. 5A. And a sealing protrusion 44 extending by branching from the seal protrusions 44, 44 provided on both-side walls is provided integrally along the communication groove 32 so as to surround each hollow groove 40. Also, on the partition wall 36 as well, the seal protrusion 44 extending continuously in the axial and in the circumferential direction is provided integrally. As shown in FIG. 4B, the above-described continuous seal protrusion 44 divides the first and second pockets 20a, 20b, and the seal protrusion 44 extends so as to surround the locking concave portion 36a and second hollow grooves 42, 42 on the both sides thereof, by which sealing in above mentioned portions can be exhibited sufficiently.

As shown in FIGS. 9 to 12, orifice members 24a, 24b and the inner peripheral surface of the outer sleeve 14 define the orifice passage 26 therebetween, and thus orifice members 24a, 24b are formed by a vulcanized product of the elastic material having a substantially arcuate shape with a predetermined thickness. A plate-shaped core 46 press-formed into an inner peripheral shape of the corresponding orifice member is embedded in the inside of the orifice member 24a, 24b for the purpose of reinforcement, etc. Of the orifice member 24 formed by the vulcanized product of the elastic material, a rubber portion, which is on the inner surface of the core 46 and provides the inner peripheral surface of the orifice member 24, is made as an abutting portion 47 having a predetermined thickness. In this embodiment, highly damping rubber material consisting of a blend material of NR (natural rubber) and SBR (styrene-butadiene rubber) or a blend material of NR and BR (butadiene rubber) and self-lubricating rubber material formed by blending a predetermined amount of fatty acid amide or a polyethylene glycol type surface active agent to a rubber material such as NR, SBR and BR, for instance, are used suitably as an elastic material forming the whole of the orifice member 24 including the abutting portion 47.

The core 46 embedded in the orifice member 24 is provided in the projecting state in both end portions of an arcuate-shaped orifice member 24, and a locking portion 48 is formed in a state in which the whole surface of one projecting portion thereof is covered with an elastic material extending from the body of the orifice member 24. The locking portion 48 can be securely fixed to the locking concave portion 36a provided in the partition wall 36 in the intermediate vulcanized product.

On the plate-shaped core 46 projecting from the other end portion of an arcuate shape of the orifice member 24, there is provided an orifice groove 50 having a predetermined depth formed in the outer peripheral surface of the orifice member 24. On the both sides of the end of the core 46, there are formed both-side wall portions 52, 52 forming the end portion of the orifice groove 50, and the both-side wall portions 52, 52 are formed by the rising elastic wall extending integrally from the elastic material forming the body of the orifice member 24. The trough-form protrusion 54 is formed by the both-side wall portions 52, 52 and the projecting end portion of the core 46, and the orifice groove 50 is open at the tip end of the trough-form protrusion 54.

Figure 10A:
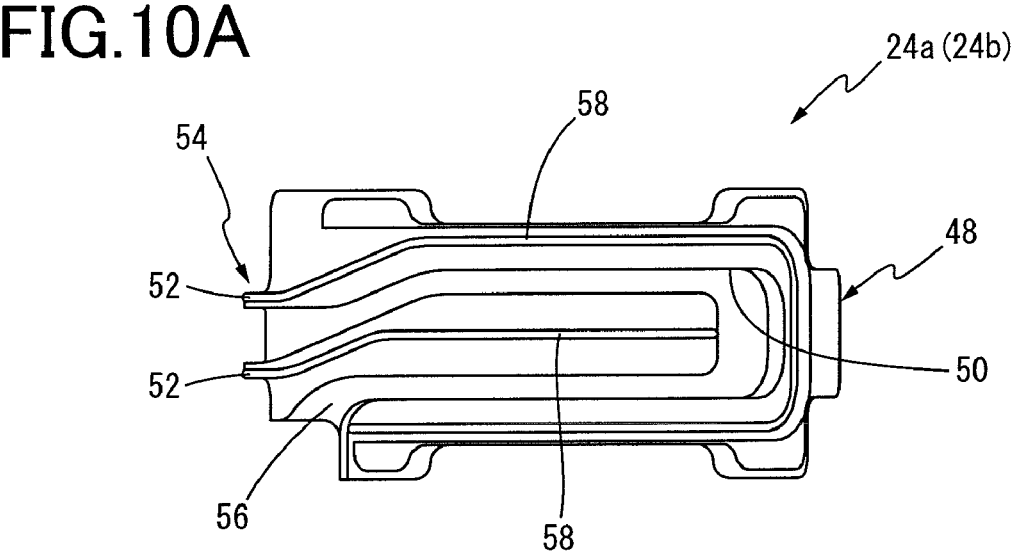
FIG. 10A is a plan view and FIG. 10B is a bottom plan view.
Figure 10B:
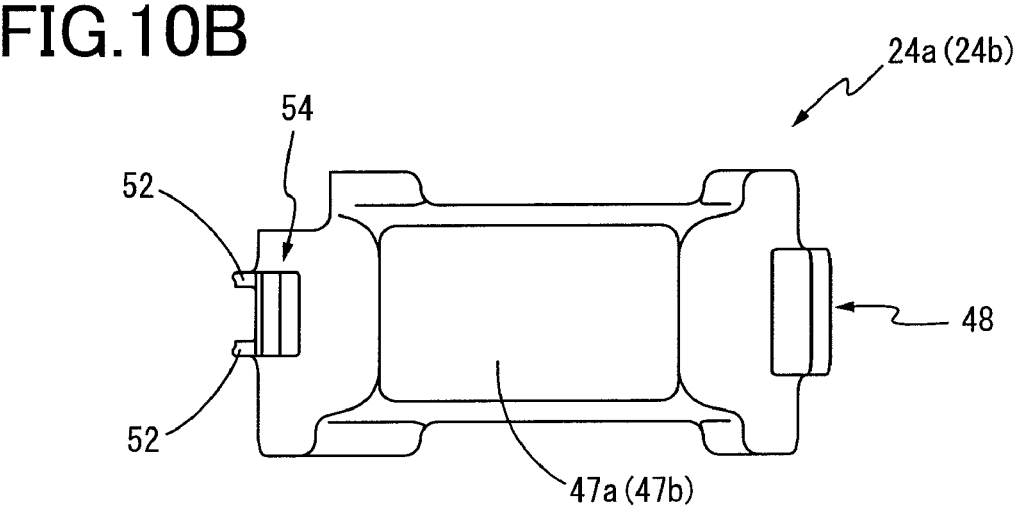

The orifice groove 50, as shown in FIG. 10A, is formed by a groove provided in the outer peripheral surface of the orifice member 24 in one continuous U-turn shape. One end portion of the orifice groove 50 is introduced to the trough-form protrusion 54, while the other end portion thereof is open to the side and made as a pocket communication port 56. As described later, owing to this arrangement, the orifice member 24 is subjected to communicate with the pocket 20 in which the orifice member 24 is disposed. Also, as is apparent form FIGS. 10A and 11A, the orifice groove 50 extending to the trough-form protrusion 54 is configured so that the groove has wider width gradually from a portion provided on the body of the orifice member 24 toward the trough-form protrusion 54, and the groove width of the orifice groove 50 formed at least in the trough-form protrusion 54 is wider than that of the portion on the body side, so that the flow path cross-sectional area is made to be large.

The sealing protrusion 58 is provided integrally on the outer peripheral surface of the orifice member 24 so as to be located on the upper surface of walls on the both sides of the orifice groove 50, and thereby the sealing is enhanced. Further, the end face of a portion surrounding the trough-form protrusion 54 of the orifice member 24, in other words, the end face of the side on which the trough-form protrusion 54 of the orifice member 24 is provided, is formed into a shape corresponding to the end face around the communication groove 32 in which the trough-form protrusion 54 is fitted and which is provided in the communication groove-forming elastic body 34 in the intermediate vulcanized product 30. Owing to abut and assemble the above mentioned two end faces each other, the sealing between the orifice member 24 and the communication groove-forming elastic body 34 can be improved.

The first and second orifice members 24a, 24b constructed as described above are mounted on the aforementioned intermediate vulcanized product 30, and the outer sleeve 14 with the seal rubber layer 62 having a predetermined thickness on the inner peripheral surface thereof is fitted on and secured to the intermediate vulcanized product 30, whereby the suspension bush 10 as shown in FIG. 1 and FIG. 2 can be obtained. To achieve this, the first and second orifice members 24a, 24b are interposed in the circumferential direction over the openings of the first and second pockets 20a, 20b provided in the elastic body 16, so as to close the openings of the first and second pockets 20a, 20b, in addition, the abutting portions 47a, 47b of the orifice members 24a, 24b are positioned oppositely with respect to the bottom surface of the pockets 20a, 20b, respectively.

Described more particularly, the locking portion 48 provided in one end of each orifice member 24 is locked to the locking concave portion 36a provided in one partition wall 36 of the small diameter portion of the metal sleeve 28 in the intermediate vulcanized product 30, while the trough-form protrusion 54 provided in the other end portion in the circumferential direction of the orifice member 24 is fitted and positioned in the communication groove 32 formed in the communication groove-forming elastic member 34 provided in the other small diameter portion of the metal sleeve 28. Thereby, as shown in FIG. 13, there is produced an assembly 60 which has the first and second orifice member 24a, 24b mounted on the intermediate vulcanized product.

Figure 13:
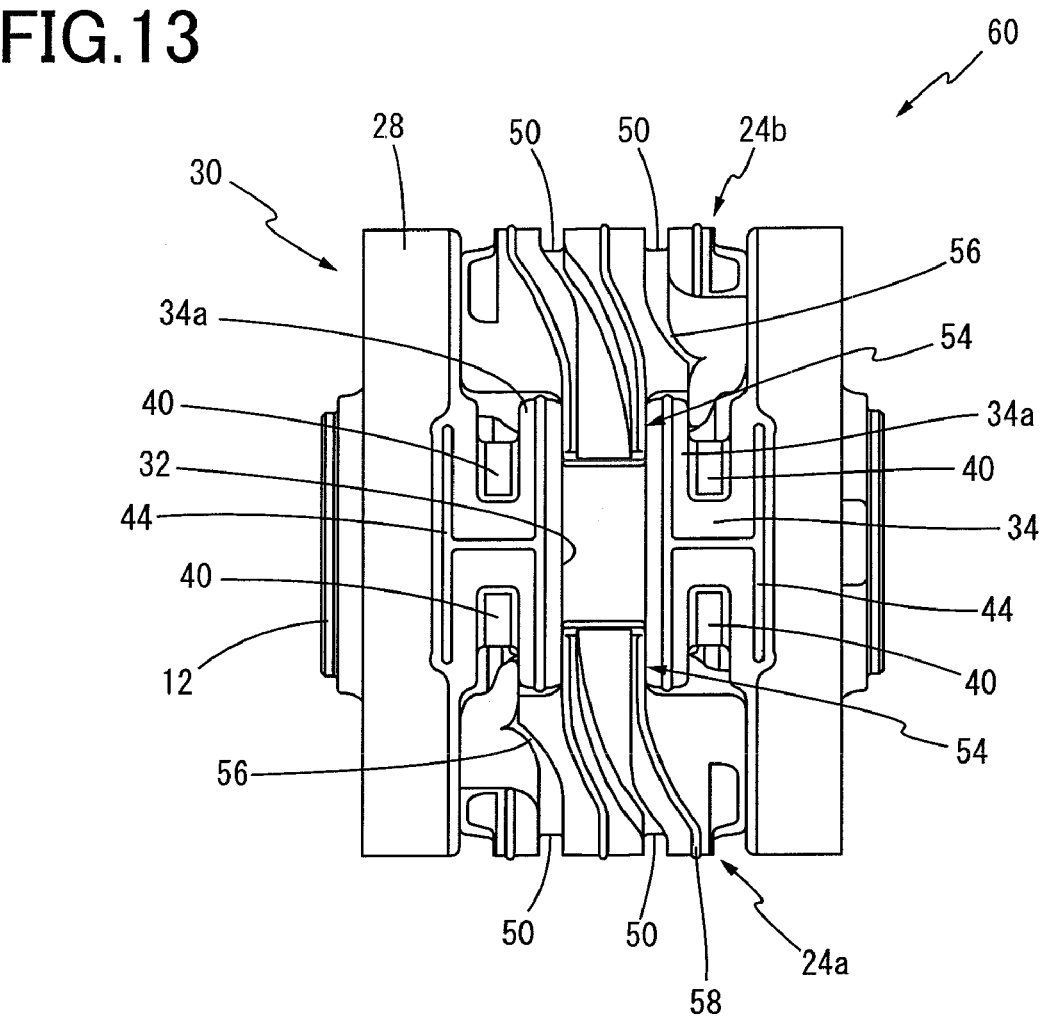
FIG. 13 is a view showing a state in which a trough-form protrusion of an orifice member is fitted and positioned in a communication groove formed in a mount, and the mount is formed by being interposed and secured the orifice member, shown in FIG. 9, to an intermediate vulcanized product shown in FIG. 3.

In such an assembly 60, as shown in FIG. 13, the hollow grooves 40, 40 formed on both sides of the communication groove 32 is configure to be longer in the circumferential direction than a length of a protrusion part of the trough-form protrusion 54 to be inserted in the communication groove 32, the trough-form protrusion 54 being provided in the end portion of the orifice groove 50 of the orifice member 24. The first and second orifice members 24a, 24b is mounted on the intermediate vulcanized product 30, and the orifice grooves 50, 50 of the orifice members 24a, 24b is connected each other via the communication groove 32, and the orifice grooves 50, 50 is subjected to communicate with the corresponding first and second pocket 20a, 20b, respectively, through the pocket communication ports 56, 56 of the orifice members 24a, 24b.

An outer sleeve 14 is fitted by compressive force on the thus constructed, thereby the orifice grooves 50, 50 of the first and second orifice members 24a, 24b and the communication groove 32 are closed by the inner surface of the outer sleeve 14 (the sealing rubber layer 62), at the same time the orifice passage 26 is formed to permit the first and second fluid chambers 22a, 22b corresponding to the first and second pockets 20a, 20b to communicate each other.

In this embodiment, the length and flow path cross-sectional area and the like of thus constructed orifice passage 26 are tuned so as to exhibit a great damping effect especially against the relatively low frequency of about 5 Hz to about 10 Hz out of low-frequency vibrations of about 5 Hz to 15 Hz causing shimmy generated by an application of relatively small external vibrational load when the motor vehicle runs.

The diameter-reducing operation is performed according to eight-die-using drawing, for instance, for the assembly 60 on which the outer sleeve 14 is fitted. Owing to the diameter-reducing operation, the diameter of the outer sleeve 14 is reduced, whereby the outer sleeve 14 is fixed effectively on the assembly 60. And the sealing protrusions 44, 58 are pressed by the inner peripheral surface of the outer sleeve 14, by which a sealing around the first and second fluid chambers 22a, 22b (the first and second pockets 20a, 20b), the orifice passage 26, and the hollow grooves 40 can be assured sufficiently, whereby the suspension bush 10 as shown in FIGS. 1 and 2 is produced.

As apparent from FIG. 1 and FIG. 2, in thus constructed suspension bush 10, the first fluid chamber 22a, of the two fluid chambers 22a, 22b, provided by the pocket 20a located on the side which vibrational load is applied to at the starting and accelerating time of motor vehicle, includes the stopper rubber protrusion 38 provided on the bottom of the first pocket 20a, and the abutting portion 47a of the first orifice member 24a located so as to be opposed to the stopper rubber protrusion 38, as a part of wall portion. The second fluid chamber 22b, provided by the pocket 20b located on the side which vibrational load is applied to at the braking time of the motor vehicle, includes the bottom surface of the second pocket 20b and the abutting portion 47b of the second orifice member 24b located so as to be oppose to the bottom surface of the second pocket 20b, as a part of wall portion.

In the present embodiment, a distance D1 between the stopper rubber protrusion 38 and the abutting portion 47a of the first orifice member 24a forming a part of wall portion of the first fluid chamber 22a located on the side which vibrational load is applied to at the accelerating time and the like of motor vehicle is set so that the stopper rubber protrusion 38 and the abutting portion 47a are not brought into abutting contact with each other upon application of relatively low-frequency vibrations of about 5 Hz to about 15 Hz causing shimmy, and the stopper rubber protrusion 38 and the abutting portion 47a are brought into abutting contact with each other when a displacement between the inner sleeve 12 and the outer sleeve 14 in the radial direction is applied due to a load applied at the time of sudden accelerating of motor vehicle (when the inner sleeve 12 and the outer sleeve 14 are displaced relative to each other in the radial direction).

In the present suspension bush 10, the fluid is forced to flow sufficiently between the first and second fluid chambers 22a, 22b through the orifice passage 26 upon application of relatively low-frequency vibrations of about 5 Hz to about 15 Hz causing shimmy. As a result, the suspension bush 10 exhibits an excellent damping effect with respect to the input vibrations on the basis of the flow or resonance of the fluid and the shimmy can be prevented advantageously. The stopper rubber protrusion 38 and the abutting portion 47a of the first orifice member 24a are brought into abutting contact with each at the time of sudden accelerating of motor vehicle, and is caused to prevent the excessive displacement between the inner sleeve 12 and the outer sleeve 14 in the radial direction (the direction perpendicular to the axial direction), in other words, the amount of deformation of the elastic body 16 connecting the inner sleeve 12 and the outer sleeve 14 can be restricted effectively.

In the present embodiment, a distance D2 between the bottom surface of the second pocket 20b and the abutting portion 47b of the second orifice member 24b forming a part of wall portion of the second fluid chamber 22b located on the side which vibrational load is applied to at the braking time of motor vehicle is set so that the bottom surface of the second pocket 20b and the abutting portion 47b are brought into abutting contact with each other when a displacement between the inner sleeve 12 and the outer sleeve 14 in the radial direction is applied due to a high load applied at the time of braking of motor vehicle (when the inner sleeve 12 and the outer sleeve 14 are displaced relative to each other in the radial direction). At the time of braking, the stopper rubber protrusion 38 and the abutting portion 47a of the first orifice member 24 is not brought into abutting contact with each other, since the inner sleeve 12 and the outer sleeve 14 are displaced relative to each so that the stopper rubber protrusion 38 and the abutting portion 47a of the first orifice member 24 are separated from each other, according to the arrangement position of the first pocket 20a.

In the thus constructed suspension bush 10, the bottom surface of the second pocket 20b and the abutting portion 47b of the second orifice member 24b prevent the excessive displacement between the inner sleeve 12 and the outer sleeve 14 in the radial direction (the direction perpendicular to the axial direction) at the braking time, in other words, function effectively as a stopper for restricting the amount of deformation of the elastic body 16 connecting the inner and outer sleeves 12, 14.

In the case in which the distance D2 between the bottom surface of the second pocket 20b and the abutting portion 47b is smaller than the arranged value in this embodiment, namely, the bottom surface of the second pocket 20b and the abutting portion 47b are brought into abutting contact with each other due to a lower than the high vibrational load applied at the braking time, the bottom surface of the second pocket 20b and the abutting portion 47b pushed against each other upon application of the high vibrational load at the time of braking, and are brought into abutting contact with each other in an elastically deformed state to some degree, thereby it cannot be avoided that respective spring characteristics of the bottom surface portion and the abutting portion 47a to be hard or stiff.

In the case in which the distance D2 between the bottom surface of the second pocket 20b and the abutting portion 47b has the arranged distance in this embodiment, namely, the bottom surface of the second pocket 20b and the abutting portion 47b are brought into abutting contact with each other for the first time upon application of high vibrational load at the braking time, and are brought into abutting contact with each other softly.

Therefore, the bottom portion including the bottom surface of the second pocket 20b and the abutting portion 47b of the second orifice member 24b are elastically deformed with sufficient soft spring characteristic, whereby the fluid is forced to flow through the orifice passage 26 surely. A damping effect with respect to the relatively low-frequency vibration of about 5 Hz to about 15 Hz causing brake judder generated by vibrations in substantially the same low-frequency region as that of shimmy is exhibited on the basis of the flow or resonance of the fluid. Consequently, the generation of brake judder can be prevented effectively.

Moreover, the tuning frequency of the orifice passage 26 is set on the low frequency side of about 5 Hz to about 10 Hz out of the relatively low frequency region in which brake judder is generated, whereby even if the spring characteristics is somewhat harden when brake judder is generated, the loss factor obtained by the flow of fluid through the orifice passage 26 reaches the highest in the relatively low region of about 5 Hz to about 15 Hz, even though each spring characteristic of the bottom portion of the second pocket 20b and the abutting portion 47b of the orifice member 24b is harder due to the mutual abutting contact as compared with the state in which the bottom portion of the second pocket 20b and the abutting portion 47b is not in abutting contact. Therefore, the generation of brake judder can be prevented surely and stably.

A distance D1 between the stopper rubber protrusion 38 of the first pocket 20a and the abutting portion 47a of the orifice member 24a and a distance D2 between the bottom surface of the second pocket 20b and the abutting portion 47b of the second orifice member 24b are not limited, and are determined appropriately by the static spring constant of the elastic body 16, the vehicle weight, and the value of vibrational load at the time of the shimmy is generated or a applied load at a time of sudden accelerating, or the like. In this embodiment, the distance D1 is set at about 1 to 3 mm, and D2 is set at about 2 to 5 mm, for instance.

As described above, in thus constructed suspension bush 10, the hollow grooves 40, 40 are formed on both left and right sides of the communication groove 32 provided in the elastic body 34, respectively. Therefore, in the producing process, the deformation of the rising walls 34a, 34a by expansion to both right and left sides, and falling of the rising walls 34a, 34a to the communication groove 32 can be restrained or prevented effectively even when a radial compressive load is applied to the assembly 60 when the diameter-reducing operation is performed on the outer sleeve 14 fitted on the assembly 60 and a compressive action in the radial direction is applied to a rising wall 34a formed by the part of the communication groove-forming elastic body 34 consisting the both-side walls of the communication groove 32 located between the communication groove 32 and the hollow groove 40.

Figure 14A:
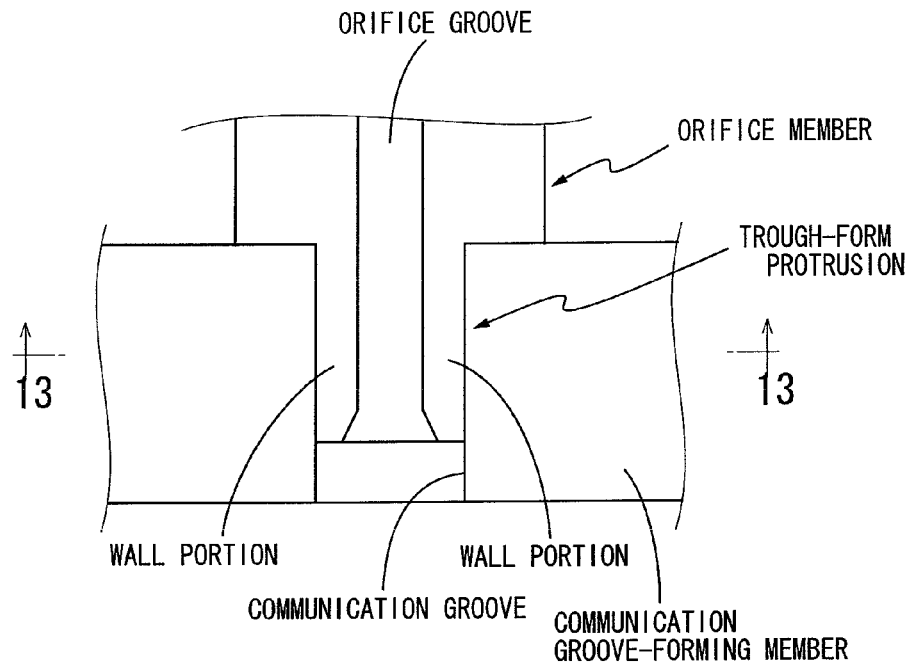
FIG. 14A is a partly enlarged view corresponding to FIG. 13.
Figure 14B:
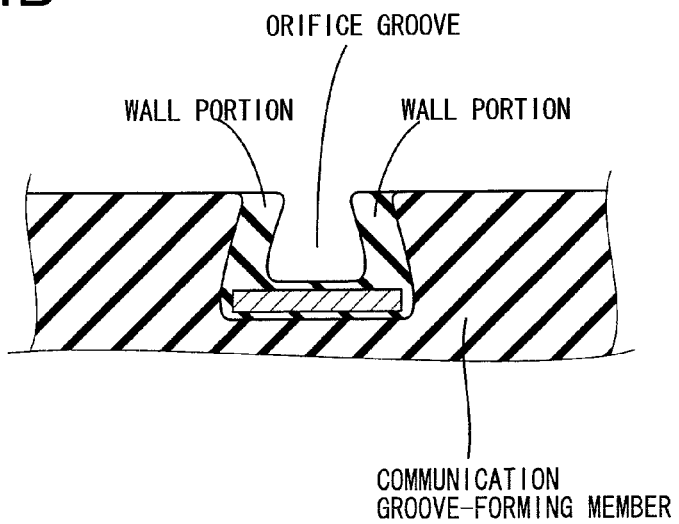
FIG. 14B is cross sectional view taken along line 13-13 of FIG. 14A at the time when a compressive load from the direction perpendicular to the paper surface is applied by means of a diameter-reducing operation.

The hollow grooves are not formed on the both sides of the communication groove in a structure as shown in FIG. 14. The communication groove-forming elastic body expands to the communication groove side and is deformed when a compressive stress in the direction perpendicular to the paper surface in the FIG. 14A is applied, since the communication groove-forming elastic body has no place to run off other than the communication groove. Thereby, as seen in FIG. 14B, the rubber-made side walls of the trough-form protrusion provided in the end portion of the orifice member falls to the inside thereof. Therefore, the cross-sectional area of the orifice groove is reduced and smaller amount of fluid is forced to flow through the orifice passage, by which the damping effect is adversely influenced.

In the structure according to the present invention, the hollow grooves 40, 40 are formed on both sides of the communication groove 32 in which the trough-form protrusion 54 is fitted. Even when a compressive stress is applied from the direction perpendicular to the paper surface in FIG. 13, the rising walls 34a, 34a on both sides of the communication groove 32 run off to both left and right sides respectively, and are not deformed expandingly to the communication groove side, so that the deformation to the communication groove 32 side is reduced, and the falling can also be avoided effectively. Therefore, the falling of the both-side wall portions 52, 52 of the trough-form protrusion 54 into the orifice groove 50 can be avoided advantageously. Accordingly, the reduction in cross-sectional area of the orifice groove 50 and hence the reduction in flow path cross-sectional area of the orifice passage 26 is avoided advantageously, and thus the deterioration in damping effect can be restrained effectively.

In addition, when the trough-form protrusion 54 is inserted in the communication groove 32, the hollow groove 32 having the length in the circumferential direction longer than the length of the protrusion part of the trough-form protrusion 54 of the orifice member to be inserted in the communication groove 32, the hollow groove 40 extends to a position farther than the tip end of the trough-form protrusion 54, thereby the expanding deformation action to the communication groove 32 side due to the compressive force in the radial direction applied to the communication groove-forming elastic body 34 is relaxed effectively. Therefore, the deforming action to the orifice groove 50 side with respect to the both-side wall portions 52, 52 of the orifice member in the trough-form protrusion 54 can be relaxed more effectively.

As described above, even when the both-side wall portions 52, 52 of the trough-form protrusion 54 of the orifice member 24 fitted in the communication groove 32 is subjected to compressing action by the diameter-reducing operation, the both-side wall portions 52, 52 in the trough-form protrusion 54 are not deformed greatly to the communication groove 32 side and do not fall to the inside. Therefore, the formation of a gap between the side wall portion 52 and the side wall 34a of the communication groove 32 is restrained or inhibited advantageously, so that the sealing therebetween can be secured advantageously. Also, the end face of a portion surrounding the trough-form protrusion 54 of the orifice member 24 is formed so as to have a shape corresponding to the end face (end face in the circumferential direction) around the communication groove 32 in the communication groove-forming elastic body 34, in which the trough-form protrusion 54 is fitted. By bringing these two end faces into contact with each other, as shown in FIG. 1, the adhesion therebetween can be enhanced and the sealing therebetween can be improved advantageously.

As apparent from FIG. 4A and FIG. 5A, there are formed the seal protrusions 44, 44 extending continuously along the communication groove 32 on the upper surface of the both-side walls 34a, 34a of the communication groove 32, respectively. And the seal protrusions 44, 44 on the both-side walls are provided continuously so as to extend in such a manner to surround the communication groove 32 on the end surface around the communication groove 32, and are mutually connected. Thereby, the sealing between the communication groove 32 and each orifice member 24 can further be improved.

Figure 11A:
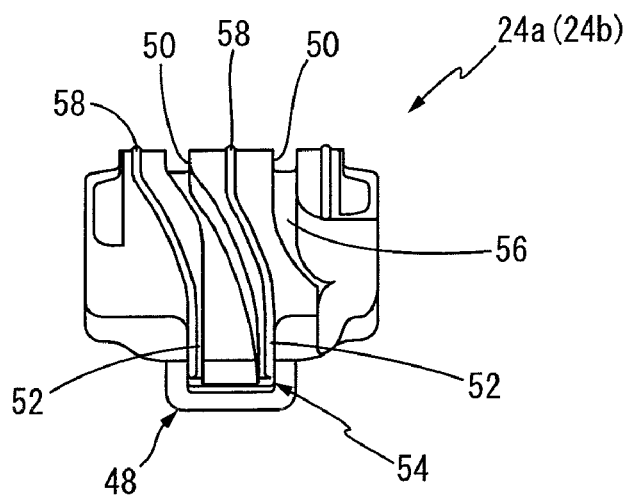
FIG. 11A is an elevational side view taken toward the left-hand side of the orifice member and FIG. 11B a cross sectional view taken along line 11-11 of FIG. 9.
Figure 11B:
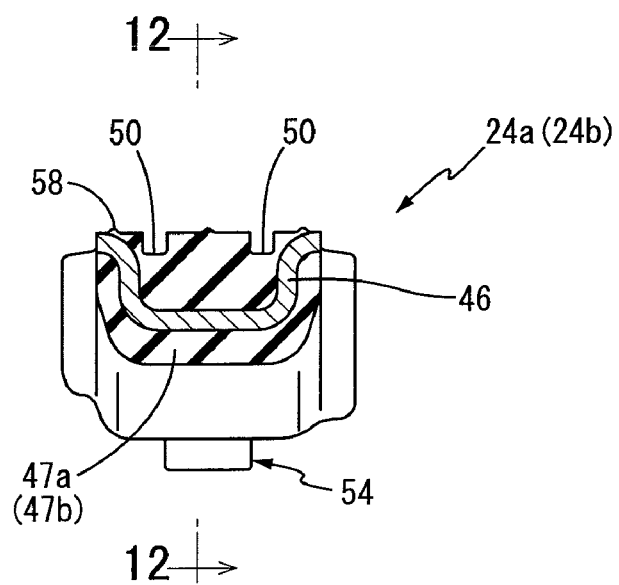
FIG. 11 is different views of the orifice member as seen in FIG. 9.
Figure 12:
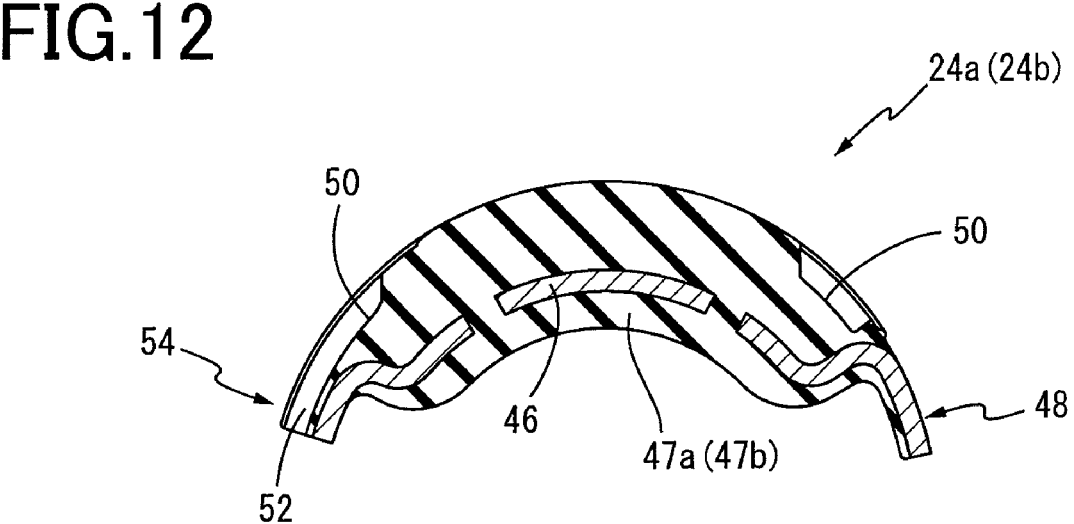
FIG. 12 is a cross sectional view taken along line 12-12 of FIG. 11B.

Further, as apparent from FIG. 11A and FIG. 13, in the present embodiment, the orifice groove 50 provided in the outer surface of the orifice member 24 is configured so that the width of the trough-form protrusion 54 is wider than that of the orifice groove portion provided in the body of the orifice member 24, so as to make a cross-sectional area to permit a larger amount of flow of fluid than that of the body portion of the orifice member 24 having a cross-sectional area corresponding to a vibration frequency to be controlled. Therefore, even when the both-side wall portions 52,52 in the trough-form protrusion 54 are deformed greatly to the orifice groove 50 side due to the compressive action by the diameter-reducing operation, the cross-sectional area to permit the sufficient amount of flow of fluid is secured and the deterioration in the damping effect is avoided adequately.

Further, in the present suspension bush 10 mounted on the vehicle can prevent both of the generation of shimmy at the running time of the motor vehicle and the generation of brake judder at the braking time of the motor vehicle effectively, thereby exhibit excellent damping effect.

In thus present suspension bush 10, the elastic material forming the whole of the orifice member 24 including the abutting portion 47 is made of highly damping rubber material or self-lubricating rubber material, for instance, as described above. The high damping capability unique to the highly damping rubber material is assured literally by employing the highly damping rubber material. Thereby, upon an application of the excessive vibrational load due to the braking of the vehicle, in the state in which the bottom of the second pocket 20b and the abutting portion 47b of the second orifice member 24b are in contact, the damping effect with respect to the relatively low-frequency vibration causing brake judder can be obtained based on the elastic deformation of the abutting portion 47b of the second orifice member 24b sufficiently and the generation of brake judder can be prevented more effectively.

In the case in which the whole of the orifice member 24 including the abutting portion 47 is formed of self-lubricating rubber material, when vibrations are applied in a state in which the abutting portion 47b of the second orifice member 24b and the bottom surface of the second pocket 20b are in contact with each other, soft spring characteristics may be exhibited at the abutting portion 47b by the sliding action of the abutting portion 47b of the second orifice member 24b on the bottom surface of the second pocket 20b. In this case as well, as in the case in which the orifice member 24 is formed by the highly damping rubber material, when high load is applied due to braking operation, under a condition in which the bottom surface of the second pocket 20b and the abutting portion 47b of the second orifice member 24b are brought into contact with each other, a damping effect against low-frequency vibrations causing brake judder can be achieved more sufficiently due to the elastic deformation of the contact portion 47b of the second orifice member 24b. Therefore, the occurrence of brake judder can be prevented more effectively.

In the case in which the orifice member is formed of self-lubricating rubber material, the noise such as rubbing noises and squeal noises generated by the slide of the abutting portion 47b of the second orifice member 24b on the bottom surface of the second pocket 20b can be prevented effectively. Moreover, the coefficient of friction on the inner peripheral surface of the orifice groove 50 in the orifice member 24 is reduced advantageously, and thereby the flow of fluid in the orifice passage 26 formed by such an orifice groove is enhanced effectively. Therefore, the flow of fluid through the orifice passage 26 is exhibited effectively and stably.

In the suspension bush 10 constructed according to the present embodiment, at the time of sudden acceleration or brake operation of motor vehicle on which the suspension bush 10 is mounted, the elastic deformation of the elastic body 16 is limited by the contact between the abutting portion 47a of the first orifice member 24a and the stopper rubber protrusion 38 provided on the bottom surface of the first pocket 20a or the contact between the abutting portion 47b of the second orifice member 24b and the bottom surface of the second pocket 20b. Therefore, damage or the like caused by excessive elastic deformation of the elastic body 16 can be prevented advantageously, so that the usage durability can be improved advantageously.

While the preferred embodiment of the present invention has been described in detail, for illustrative purpose only, it is to be understood that the present invention is not limited to the details of the illustrated embodiment.

For instance, in the illustrated embodiment, a pair of pockets 20 (fluid chambers 22) is provided symmetrically with respect to the inner sleeve 12 therebetween. The pocket 20 needs to be provided only in plural numbers in the same structure as the conventional one. Also, the number of the orifice member 24 disposed in the pocket 20 may be one if the orifice member 24 provides an orifice passage having a flow path cross-sectional area and a length sufficiently corresponding to the frequency of vibrations to be controlled. The specific structure such as the form and the location of the orifice groove 50 and the orifice passage 26 may be suitably determined as required.

In the illustrated embodiment, the inner sleeve 12 and the outer sleeve 14 are spaced apart from each other in a direction perpendicular to the axial direction with a suitable distance therebetween in a coaxial or concentric relation with each other, and the inner and outer sleeve 12, 14 are elastically connected to each other via the elastic body 16 interposed therebetween. Besides, well known configurations may be taken suitably, for instance, the inner sleeve 12 and the outer sleeve 14 are elastically connected each other by the elastic body 16 with the center being shifted so as to be positioned concentrically when an initial load is applied.

Moreover, as the elastic material forming elastic body 16, for instance, and as the non-compressible fluid filled in the fluid chamber 22, any known material or fluid may be suitably employed. For instance, as the non-compressible fluid, water, alkylene glycol, polyalkylene glycol, silicone oil, etc. are used. In general, a low-viscosity fluid having a viscosity not higher than 0.1 Pa·s is suitably employed.

The tuning frequency of the orifice passage 26 may be suitably determined depending upon the required damping effect.

The stopper rubber protrusion 38 is provided only on the bottom surface of the first pocket 20a, of the pair of pockets 20a, 20b, located on the side on which vibrational load is applied at the accelerating time of motor vehicle, in the above described embodiment. However, in addition to the first pocket 20a, or in place of the first pocket 20a, the stopper rubber protrusion 38 may be provided on the bottom surface of the second pocket 20b located on the side on which vibrational load is applied at the braking time of motor vehicle. Also, the stopper rubber protrusion 38 may be omitted. In any case, in order to prevent the occurrence of both shimmy and brake judder, it is necessary to set the distance D1 between the contact portion 47a of the first orifice member 24a and the stopper rubber protrusion 38 and the distance D2 between the abutting portion 47b of the second orifice member 24b and the bottom surface of the second pocket 20b at distances mentioned before.

While the suspension bush for a motor vehicle has been described as one embodiment of this invention, the principle of the invention is equally applicable to any other cylindrical fluid-filled damping device such as a engine mount, a strut bar cushion and suspension upper support of a motor vehicle, and a cylindrical damper used in various devices or vibration-transmitting systems other than the motor vehicle.

It is to be understood that the present invention may be embodied with various other changes, modifications and improvements, which may occur to those skilled in the art, without departing from the sprit and scope of the invention defined in the attached claims.

What is claimed is:

1. A cylindrical fluid-filled elastic mount, comprising:
a center shaft member;
a metal sleeve disposed radially outwardly of said center shaft member with a predetermined radial distance therebetween, which has a plurality of windows passed through a cylindrical wall thereof;
an elastic body interposed between said center shaft member and said metal sleeve for elastic connection therebetween, which has a plurality of pockets being open in an outer circumferential surface of said metal sleeve through the corresponding windows thereof;
a communication groove-forming elastic member disposed on said outer circumferential surface of said metal sleeve, which has a communication groove so that two said pockets to be connected, of said plurality of pockets, communicate therebetween in the circumferential direction so as to be open in said outer circumferential surface;
an orifice member provided with an orifice groove at an outer surface thereof, which has a trough-form protrusion in which at least both-side wall portions provided at an end of said orifice groove are formed by an elastic material, and said trough-form protrusion being inserted in said communication groove so as to be fixed to said communication groove; and
an outer cylindrical member fitted on said metal sleeve and fixed by decreasing the diameter to close at least said plurality of windows and said orifice groove, and defining a plurality of fluid chambers filled with a non-compressible fluid corresponding to said pockets and an orifice passage corresponding to said orifice groove,
wherein at least one hollow groove is provided in a portion of said communication groove-forming elastic member, the at least one hollow groove is positioned at one side of said communication groove into which said trough-form protrusion provided in an end portion of said orifice groove of said orifice member is inserted, and
the at least one hollow groove extends in the circumferential direction alongside said communication groove to prevent deformation of said side wall portions provided at the end of said orifice groove.

2. The cylindrical fluid-filled elastic mount according to claim 1, wherein an end surface of a portion surrounding said trough-form protrusion of said orifice member is formed into a shape corresponding to an end surface around said communication groove of said communication groove-forming elastic member in which said trough-form protrusion is inserted, and said two end surfaces are brought into abutting contact with each other and secured, for effecting sealing between said orifice member and said communication groove-forming elastic member.

3. The cylindrical fluid-filled elastic mount according to claim 1, wherein said orifice groove provided at the outer surface of said orifice member is formed at said trough-form protrusion so as to have a cross-sectional area to permit a larger amount of flow of fluid than another portion having said cross-sectional area corresponding to a vibration frequency to be controlled.

4. The cylindrical fluid-filled elastic mount according to claim 1, wherein said orifice member is a vulcanized product of elastic material.

5. The cylindrical fluid-filled elastic mount according to claim 1, wherein said orifice member is formed into an arcuate shape set in the circumferential direction in an opening portion of said pocket; said trough-form protrusion is formed at a first end of said orifice groove provided at said outer surface of said orifice member; and a second end of said orifice groove is subjected to communicate with an interior of said pocket.

6. The cylindrical fluid-filled elastic mount according to claim 1, wherein said orifice member is formed so that a bottom surface of said pocket is brought into abutting contact with an inside surface of the arcuate shape of said orifice member in the radial direction upon application of a large displacement between said center shaft member and said outer cylindrical member in the radial direction, and said orifice member functions as a stop.

7. The cylindrical fluid-filled elastic mount according to claim 6, wherein said orifice member includes an abutting portion consisting of elastic material on the inside surface of said arcuate shape; said orifice passage is tuned to a low frequency region of shimmy of about 5 Hz to above 15 Hz; and said shaft member and said outer cylindrical member are interposed between two members constituting a vibration-transmitting system of a vehicle; whereby said orifice member is brought into abutting contact with said bottom surface of said pocket at said abutting portion when a displacement between said center shaft member and said outer cylindrical member in the radial direction is applied due to a load applied at the time of braking of the vehicle under a condition in which said two members constituting the vibration-transmitting system of a vehicle are respectively connected to said center shaft member and said outer cylindrical member.

8. The cylindrical fluid-filled elastic mount according to claim 7, wherein said orifice passage is tuned to a low frequency of about 5 Hz to 10 Hz.

9. The cylindrical fluid-filled elastic mount according to claim 7, wherein said abutting portion of orifice member is formed of a damping rubber material selected from a group consisting of a blend of natural rubber and styrene-butadiene rubber, and a blend of natural rubber and butadiene rubber.

10. The cylindrical fluid-filled elastic mount according to claim 7, wherein said abutting portion of orifice member is formed of self-lubricating rubber material.

11. The cylindrical fluid-filled elastic mount according to claim 1, wherein a stopper rubber protrusion having a predetermined height is integrally formed on the bottom surface of said pocket.

12. The cylindrical fluid-filled elastic mount according to claim 1, wherein a sealing protrusion continuously extending along said communication groove is formed on an each upper surface of both-side walls of said communication groove formed in said communication groove-forming elastic member respectively, while said sealing protrusions are provided continuously on said both-side walls so as to extend surrounding said communication groove on an end surface around said communication groove, and are mutually connected.

* * * * *